United States Patent [19]
Iida et al.

[11] Patent Number: 5,457,573
[45] Date of Patent: Oct. 10, 1995

[54] DIFFRACTION ELEMENT AND AN OPTICAL MULTIPLEXING/DEMULTIPLEXING DEVICE INCORPORATING THE SAME

[75] Inventors: Masanori Iida, Neyagawa; Hiroyuki Asakura, Osaka, both of Japan

[73] Assignee: Matsushita Electric Industrial Co., Ltd., Kadoma, Japan

[21] Appl. No.: 209,213

[22] Filed: Mar. 10, 1994

[30] Foreign Application Priority Data

Mar. 10, 1993 [JP] Japan ..................... 5-048838

[51] Int. Cl.⁶ ................. G02B 5/18; G02B 27/44; H04J 14/08
[52] U.S. Cl. ............... 359/569; 359/127; 359/130; 359/572; 359/576
[58] Field of Search ................. 359/566, 569, 359/572, 576, 590, 124, 127, 130

[56] References Cited

U.S. PATENT DOCUMENTS

| | | | |
|---|---|---|---|
| 3,698,795 | 10/1972 | Flint . | |
| 4,531,809 | 7/1985 | Carter et al. | 359/572 |
| 4,838,645 | 6/1989 | Mächler et al. | 359/572 |
| 4,867,532 | 9/1989 | Stanley | 359/572 |
| 5,015,069 | 5/1991 | Bryan et al. | 359/572 |
| 5,026,131 | 6/1991 | Jannson et al. | 359/569 |
| 5,208,700 | 5/1993 | Harris et al. | 359/569 |
| 5,296,949 | 3/1994 | Pennace | 359/576 |

FOREIGN PATENT DOCUMENTS

| | | | |
|---|---|---|---|
| 2222645 | 11/1974 | France | 359/572 |
| 2535072 | 4/1984 | France | 359/572 |
| 60-173510 | 9/1985 | Japan | 359/572 |
| 62-61002 | 3/1987 | Japan . | |
| 4-282603 | 10/1992 | Japan . | |
| 995050 | 2/1993 | U.S.S.R. | 359/572 |
| 2105489 | 3/1983 | United Kingdom | 359/572 |

OTHER PUBLICATIONS

R. Petit, *Electromagnetic Theory of Gratings*, Springer–Verlag Berlin Heidelberg, Chapter 6, p. 164 (1980).

*Primary Examiner*—Martin Lerner
*Attorney, Agent, or Firm*—Ratner & Prestia

[57] ABSTRACT

According to the present invention, a diffraction element comprising a transparent substrate having a first face and a second face; periodic grooves engraved on the first face; a reflective film provided on the first face having the periodic grooves; and a antireflection film provided on the second face, wherein the periodic grooves and the reflective film constitute a diffraction grating.

32 Claims, 5 Drawing Sheets

DIFFRACTION ELEMENT AND AN OPTICAL MULTIPLEXING/DEMULTIPLEXING DEVICE INCORPORATING THE SAME

BACKGROUND OF THE INVENTION

1. Field of the Invention

The present invention relates to a diffraction element for use in a spectroscope and an optical communication system with optical-wavelength-divisionmultiplexing, and to an optical multiplexing/demultiplexing device in which such a diffraction element is used.

2. Description of the Related Art

In recent years, various forms of diffraction elements and optical multiplexing/demultiplexing devices (optical multiplexers and optical demultiplexers) incorporating diffraction elements have been proposed and studied as key devices for optical communication systems with optical-wavelength-divisionmultiplexing (hereinafter referred to as "OWDM"). In the field of high-density OWDM-optical communication, in particular, optical multiplexing/demultiplexing devices incorporating diffraction elements are drawing particular attention. The reasons are that the high density OWDM-optical communication utilizes wavelengths with only small differences from one another, and that a large number of such wavelengths are multiplexed with one another. However, practically it is difficult to obtain diffraction elements that have a high diffraction efficiency over a broad wavelength range in the current state of the art.

FIG. 9 shows the wavelength dependency of the diffraction efficiency of a reflective-type diffraction element with lattice grooves having a sawtooth shaped cross section. FIG. 9 is cited from "Electromagnetic Theory of Gratings" by R. Petit, <Springer-Verlag Berlin Heidelberg N.Y. 1980>. Chap. 6, p. 164. In FIG. 9, the TE (Transverse Electric) polarized light is defined as a component of light incident on the diffraction element that has a polarization direction parallel to the lattice groove direction (i.e. parallel to the grooves). The TM (Transverse Magnetic) polarized light is defined as a component of the light incident on the diffraction element that has a polarization direction perpendicular to the lattice groove direction. As is seen from FIG. 9, the diffraction efficiency of the diffraction element is greatly affected by the wavelength of the incident light, the ratio of the wavelength of the incident light to the lattice pitch, and the polarization direction of the incident light. Furthermore, as is seen from FIG. 9, there is only a very narrow range of wavelengths in which both a high diffraction efficiency and a small difference between the diffraction efficiencies for the TE polarized light and the TM polarized light are attained. For example, the wavelength area in which the diffraction efficiency is 85% or more and the difference between the TE and TM polarized lights is 10% or less extends not more than 40 nm, as calculated under the condition that the lattice groove spacing (lattice pitch) is 0.8 μm.

In view of the above-mentioned problem, incorporation of a light transmitting material upon the lattice grooves of the diffraction grating of a diffraction element has been proposed. FIG. 10 shows an exemplary configuration of such a diffraction element. As is shown in FIG. 10, a reflective diffraction substrate 56 having lattice grooves engraved thereupon is formed on a substrate 55. A light transmitting material 53 is formed on the reflective diffraction substrate 56.

In the diffraction element with the abovementioned configuration, light enters at the surface 54 of the diffraction element and is transmitted through the light transmitting material 53 and is diffracted by the diffraction grating of the reflective diffraction substrate 56. The diffracted light goes back through the light transmitting material 53 and out of the surface 54 of the diffraction element. Assuming that the refractive index of the light transmitting material 53 is n, the light going through the light transmitting material 53 equivalently has a wavelength of 1/n. This indicates that the wavelength of the incident light, taken at the moment of diffraction, can be varied by adjusting the refractive index of the light transmitting material 53. This allows the light to be diffracted at the wavelength in the above-mentioned high-diffraction efficiency range shown in FIG. 9. This technique is disclosed, for example, in Japanese Laid-Open Patent Publication NO. 6,261,002.

There has also been proposed a device capable of optical multiplexing in two wavelength bands, in which two diffraction gratings capable of optical dispersion in different wavelength bands are used. For example, Japanese Laid-Open Patent Publication No. 4-282,603 discloses an optical multiplexing/demultiplexing device as shown in FIG. 11. Light in which optical wavelength divisions are multiplexed (hereinafter such light will be referred to as 'multiplexed light'), transmitted through an input fiber 61, is led through a lens 63, so as to be incident on a first diffraction grating 64. Light components $\lambda_a$ to $\lambda_c$ of the shorter wavelength bands are optically demultiplexed by the first diffraction grating 64, and are respectively focused onto output fibers $62_a$ to $62_c$ by the lens 63. On the other hand, light components $\lambda_d$ to $\lambda_f$ of the longer wavelength bands are totally reflected, instead of being optically demultiplexed, by the first diffraction grating 64. The light totally reflected by the first diffraction grating 64 is optically demultiplexed by a second diffraction grating 65 so as to be incident on the first diffraction grating 64. The light incident on the first diffraction grating 64 is again reflected thereby, so as to be respectively focused onto output fibers $62_d$ to $62_f$ by the lens 63.

However, the first prior art technique mentioned above has the following problem: the spectroscopic characteristics of the incident light may be adjusted toward the longer wavelengths of the light by taking advantage of the fact that the light incident on the surface 54 of the diffraction grating travels through the light transmitting material 53, but, in so doing, it also ruins the original spectroscopic properties of the reflective diffraction substrate 56. In other words, diffraction is achieved in only one wavelength band and not in two more desired wavelength bands at the same time, according to this prior art technique. Moreover, in order to achieve sufficient spectroscopic properties for light of a broader range of wavelength bands, e.g. 0.8 μm, 1.3 μm, and 1.55 μm, it is necessary to incorporate each diffraction element with an appropriate light transmitting material 53 for each wavelength band, the refractive indices of the light transmitting materials 53 corresponding to the respective wavelength bands. The second prior art technique as mentioned above also requires two diffraction gratings 64 and 65.

Since diffraction elements are expensive, the requirement of two or more diffraction gratings for one device makes it difficult to reduce the production costs of the entire device. The costs will further increase in the case of the second prior art technique, because it requires the means for accurately adjusting the positions of the two diffraction gratings.

SUMMARY OF THE INVENTION

A diffraction element according to the present invention comprising a transparent substrate having a first face and a second face; periodic grooves engraved on the first face; a reflective film provided on the first face having the periodic grooves; and a antireflection film provided on the second face, wherein the periodic grooves and the reflective film constitute a diffraction grating.

In one embodiment of the invention, the reflective film is formed substantially symmetrical with respect to a rotation by 180° around an axis parallel to the grooves.

In another embodiment of the invention, the first face and the second face of the transparent substrate are substantially parallel.

Alternatively, the first face and the second face of the transparent substrate may make a specific angle.

In another embodiment of the invention, a diffraction element further comprises the transparent protection layer provided on the reflective film.

In still another embodiment of the invention, the diffraction element further comprises another antireflection film provided on the transparent protection layer.

In still another embodiment of the invention, the transparent substrate is composed of a plurality of sections having different refractive indices from one another.

In still another embodiment of the invention, the transparent protection layer includes a plurality of sections having different refractive indices from one another.

An optical multiplexing/demultiplexing device according to the present invention includes a diffraction element having a first incident face and a second incident face, and the optical multiplexing/demultiplexing device comprises: first optical input unit for letting light be incident on the first incident face of the diffraction element at a first incident angle; first light-receiving unit for receiving first diffracted light from the diffraction element, the first diffracted light having been incident on the first incident face of the diffraction element; second optical input unit for receiving light reflected by the reflective film of the diffraction element, guiding the reflected light, and letting the reflected light be incident on the second incident face of the diffraction element at a second angle; and second light-receiving unit for receiving second diffracted light from the diffraction element, the second diffracted light having been incident on the second incident face of the diffraction element.

In one embodiment of the invention, the diffraction element includes: a transparent substrate having a first face and a second face; periodic grooves engraved on the first face; a reflective film provided on the first face having the periodic grooves; and an antireflection film provided on the second face, the first incident face corresponding to the first face provided with the reflective film, and the second incident face corresponding to the second face provided with the antireflection film.

In another embodiment of the invention, the reflective film is formed substantially symmetrical with respect to a rotation of 180° around an axis parallel to the grooves.

In still another embodiment of the invention, the diffraction element further comprises a transparent protection layer provided on the reflective film.

In still another embodiment of the invention, the optical multiplexing/demultiplexing device further comprises a first lens that is arranged in Littrow-mounting with respect to the first incident face of the diffraction element and a second lens that is arranged in Littrow-mounting with respect to the second incident face of the diffraction element.

In still another embodiment of the invention, each of the first and the second incident angles is an incident angle θ in a range satisfying the following relationship:

$$\theta_L - 5° < \theta < \theta_L + 5°$$

where $\theta_L$ is the Littrow angle, and wherein a wavelength $\lambda_1$ of the light incident on the first incident face and diffracted by the diffraction element, and a wavelength $\lambda_2$ of the light incident on the first incident face and reflected by the diffraction element (where $\lambda_2 > \lambda_1$) satisfies the following relationships:

$$\lambda_{2-\lambda_1}/2 > d$$

$$n = \lambda_2/\lambda_1$$

where n is the refractive index of the transparent substrate, and d is the pitch of the grooves.

In still another embodiment of the invention, the optical multiplexing/demultiplexing device further comprises a first lens that is arranged in Littrow-mounting with respect to the first incident face of the diffraction element and a second lens that is arranged in Littrow-mounting with respect to the second incident face of the diffraction element.

In still another embodiment of the invention, each of the first and the second incident angles is an incident angle θ in a range satisfying the following relationship:

$$\theta_L - 5° < \theta < \theta_L + 5°$$

where $\theta_L$ is the Littrow angle, and wherein a wavelength length $\lambda_1$ of the light incident on the first incident face and diffracted by the diffraction element, and a wavelength $\lambda_2$ of the light incident on the first incident face and reflected by the diffraction element (where $\lambda_2 > \lambda_1$ 1TM satisfies the following relationships:

$$\lambda_{2-\lambda_1}/2 > n_1 \times d$$

$$n = n_1 \times \lambda_2/\lambda_1$$

where n is a refractive index of the transparent substrate, $n_1$ is the refractive index of the transparent protection layer, and d is the pitch of the grooves.

According to the present invention, the optical multiplexing/demultiplexing device including a diffraction element having a first incident face and a second incident face, and the optical multiplexing/demultiplexing device comprises: optical input unit for letting light be incident on the diffraction element at an incident angle; light-receiving unit for receiving light diffracted by the diffraction element; and positioning mechanism for altering positions and/or directions of at least one of the diffraction element, the optical input unit, and the light-receiving unit.

In one embodiment of the invention, the positioning mechanism allows a first arrangement for letting the light from the optical input unit be incident on the first incident face of the diffraction element and a second arrangement for letting the light from the optical input unit be incident on the second incident face of the diffraction element.

In another embodiment of the invention, the optical multiplexing/demultiplexing device further comprises a lens for collimating light from the optical input unit and for converging light reflected by the diffraction element onto the light-receiving unit, wherein the first arrangement is a Littrow mounting arrangement with respect to the first incident face of the diffraction element, and the second arrangement is a Littrow mounting arrangement with respect to the second incident face of the diffraction element.

In still another embodiment of the invention, the positioning mechanism includes a mechanism for rotating the diffraction element and for thus allowing the optical multiplexing/demultiplexing device to shift from either one of the first and second arrangements to the other.

In still another embodiment of the invention, the diffraction element includes: a transparent substrate having a first face and a second face; periodic grooves engraved on the first face; a reflective film provided on the first face having the periodic grooves; and an antireflection film provided on the second face, the first incident face corresponding to the first face provided with the reflective film, and the second incident face corresponding to the second face provided with the antireflection film.

In still another embodiment of the invention, the reflective film is formed substantially symmetrical with respect to a rotation of 180° around an axis parallel to the grooves.

In still another embodiment of the invention, the diffraction element further comprises a transparent protection layer provided on the reflective film.

In still another embodiment of the invention, each incident angle at which the light is incident on the first and second incident faces is an incident angle θ in a range satisfying the following relationship:

$$\theta_L - 5° < \theta < \theta_L + 5°$$

where $\theta_L$ is the Littrow angle, and a wavelength $\lambda_1$ of the light incident on the first incident face and diffracted by the diffraction element, and a wavelength length $\lambda_2$ of the light incident on the first incident face and reflected by the diffraction element (where $\lambda_2 > \lambda_1$) satisfies the following relationships:

$$\lambda_2 - \lambda_1/2 > d$$

$$n = \lambda_2/\lambda_1$$

where n is the refractive index of the transparent substrate, and d is the pitch of the grooves.

In still another embodiment of the invention, each incident angle at which the light is incident on the first and second incident faces is an incident angle θ in a range satisfying the following relationship:

$$\theta_L - 5° < 74 < \theta_L + 5°$$

where $\theta_L$ is the Littrow angle, and wherein a wavelength $\lambda_1$ of the light incident on the first incident face and diffracted by the diffraction element, and a wavelength $\lambda_2$ of the light incident on the first incident face and reflected by the diffraction element (where $\lambda_2 > \lambda_1$) satisfies the following relationships:

$$\lambda_2 - \lambda_1/2 > n_1 \times d$$

$$n = n_1 \times \lambda_2/\lambda_1$$

where n is the refractive index of the transparent substrate, $n_1$ is the refractive index of the transparent protection layer, and d is the pitch of the grooves.

Thus, the invention described herein makes possible the advantages of (1) providing a diffraction element having a high diffraction efficiency for a plurality of wavelength bands of light; (2) providing an optical multiplexing/demultiplexing device, in which such a diffraction element is used, capable of optical dispersion at a plurality of wavelength bands with an equally high diffraction efficiency; and (3) providing such an optical multiplexing/demultiplexing device at low production costs, by eliminating the need for a plurality of diffraction gratings.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples, with reference to the accompanying drawings.

EXAMPLE 1

Figure 1A:
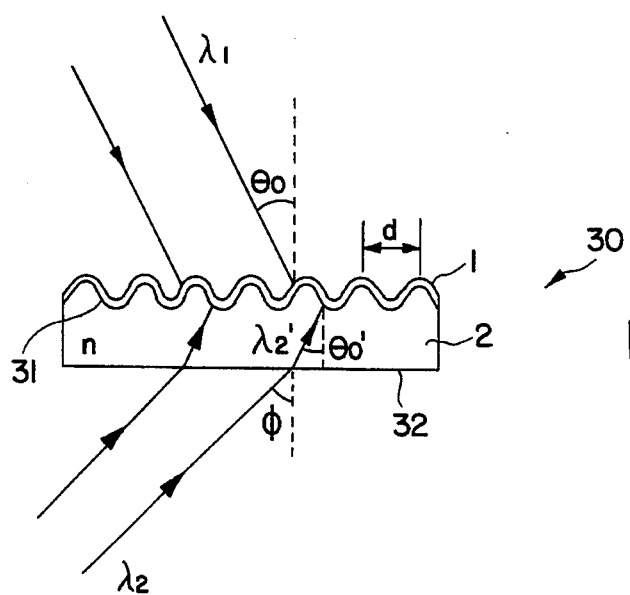
FIG. 1A shows a configuration for a diffraction element according to a first example of the present invention.

FIG. 1A shows a diffraction element 30 according to a first example of the present invention. As is shown in FIG. 1A, the diffraction element 30 comprises a transparent substrate 2 having a grating surface 31 with lattice grooves engraved at a pitch d, and a reflective film 1 formed on the grating surface 31. The reflective film 1 is formed sufficiently thin so as to allow the configuration of the lattice grooves to be effectively apparent, but thick enough so as not to undermine its properties as a reflective film. For example, the reflective film 1 may be formed by disposing a metal film with a high reflectance, e.g. an Al film, or a dielectric multilayered film, on the grating surface 31. The reflective film 1 would have a thickness in the range of 50 to 300 nm, and preferably a thickness of about 100 nm, so that it can be uniformly formed without disadvantageously concealing the configuration of the lattice grooves.

The transparent substrate 2 is typically formed of glass, but can be formed of any material that transmits light having the desired wavelength bands. The term 'transparent' is employed with this definition in mind throughout the rest of the specification.

The configuration of the lattice grooves provided on the face 31 should be such that the resulting diffraction grating on the face 31 is symmetrical with respect to a plane which is parallel to the face 31. In other words, the reflective film is formed substantially symmetrical with respect to a rotation by 180° around an axis parallel to the grooves (more precisely, the axis is at a half of the maximum depth of the grooves). Thus, the lattice grooves have an identical configuration if viewed from above and below the face 31. Although the lattice grooves are shown to have a sine-wave shaped cross section as a whole in FIG. 1A, the grooves can be formed with any other desired configuration.

Hereinafter, operating principles of the diffraction element 30 will be described with reference to FIG. 1A.

The diffraction element 30 functions as a reflective-type diffraction grating when light of a wavelength $\lambda_1$ enters at an angle $\theta_0$ from above the transparent substrate 2, as is shown in FIG. 1A. A first-order diffracted light of the incident light diffracted by the diffraction element 30 make an angle (diffraction angle) $\alpha$ to the normal axis of the grating surface 31. The diffraction angle $\alpha$ satisfies Equation (1) shown below. (Hereinafter, the present invention will be described with respect to the first-order diffracted light.)

$$\sin\theta_O + \sin\alpha = \lambda_1/d \qquad \text{Eq. (1)}$$

When the diffraction element 30 is in a Littrow-mounting arrangement, the incident angle $\theta_O$ is substantially identical with the diffraction angle $\alpha$, thereby maximizing the diffraction efficiency. Therefore, assuming that the relationship $\theta_O = \alpha = \theta_L$ (wherein $\theta_L$ represents the Littrow angle) approximately holds, Equation (1) is resolved to give the following Equation (2):

$$\sin\theta_O = \lambda_1/(2d) \qquad \text{Eq. (2)}$$

The diffraction efficiency is sufficiently high and less dependent on TE or TM polarization of the light when the incident angle $\theta_O$ is within a variation range of ±5° degrees with respect to the Littrow angle $\theta_L$. Under this condition, incident light on the diffraction element 30 at the incident angle $\theta_O$ is diffracted at different diffraction angles $\alpha$ depending on the wavelength $\lambda_1$. For example, when the incident light includes light of a plurality of wavelengths $\lambda_a, \lambda_b, \ldots$, etc. in the vicinity of the wavelength $\lambda_1$, the light is diffracted at the respective angles $\alpha_a, \alpha_b, \ldots$, etc. corresponding to the wavelengths $\lambda_a, \lambda_b, \ldots$, etc.

Hereinafter, with reference to FIG. 1A, it will be considered that the light with a wavelength $\lambda_2$ is incident on the reflective film 1 through the transparent substrate 2 from below the transparent substrate 2. As is shown in FIG. 1A, the light of the wavelength $\lambda_2$ is incident on a back face 32 of the transparent substrate 2 at an angle $\phi$, and travels through the transparent substrate 2 so as to be incident on the reflective film 1 at an angle $\theta_O$. When the refractive index of the transparent substrate 2 is n, the angles $\theta_O'$ and $\phi$ should satisfy Equation (3) shown below, according to Snell's Law.

$$n \times \sin\theta_O' = \sin\phi \qquad \text{Eq. (3)}$$

An equivalent wavelength $\lambda_2'$ of the light traveling through the transparent substrate 2 satisfies the following Equation (4):

$$\lambda_2' = \lambda_2/n \qquad \text{Eq. (4)}$$

Thus, by prescribing the refractive index n and the incident angle $\phi$ so that the wavelength $\lambda_2'$ substantially equals the wavelength $\lambda_1$, and that the incident angle $\theta_O'$ equals the incident angle $\theta_O$, the diffraction of the light with the wavelength $\lambda_2$ by the reflective film 1 in the transparent substrate 2 would be substantially equal to the diffraction of the light with the wavelength $\lambda_1$ by the reflective film 1 without the transparent substrate 2. In other words, the diffraction element 30 functions as a reflective-type diffraction grating that has substantially the same diffraction efficiency for light of both wavelengths $\lambda_1$ and $\lambda_2$. Moreover, by forming the lattice grooves in such a way that the resulting diffraction grating on the face 31 is symmetrical with respect to a plane which is parallel to the face 31 (i.e. in a reversible configuration), the diffraction element 30 can have the same spectroscopic properties for light of both wavelengths $\lambda_1$ and $\lambda_2$.

Figure 1B:
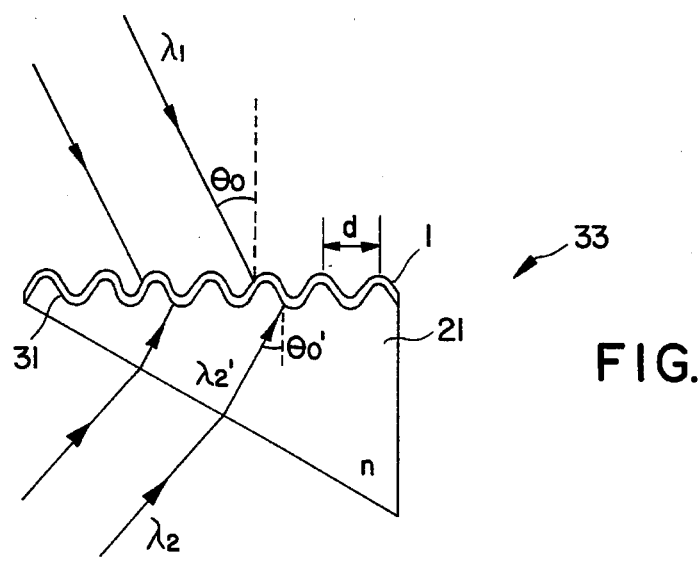
Figure 1B shows another configuration for a diffraction element according to a first example of the present invention.

It is preferable that the back face 32 of the transparent substrate 2 is a plane. However, the back face 32 need not be disposed in parallel to the plane in which the lattice grooves are formed. For example, it is applicable to form the diffraction element 33 of a prism-like transparent substrate 21 having a face 31 on which lattice grooves are engraved, as is shown in Figure 1B.

As has been described, according to the present invention, it is possible to achieve, with one diffraction element, the same spectroscopic properties for light beams of different wavelengths that are each incident on either of the two sides of the grating surface (or the reflective film 1). As a result, a diffraction element is provided which can be suitably used for two or more wavelength bands.

EXAMPLE 2

Figure 2:
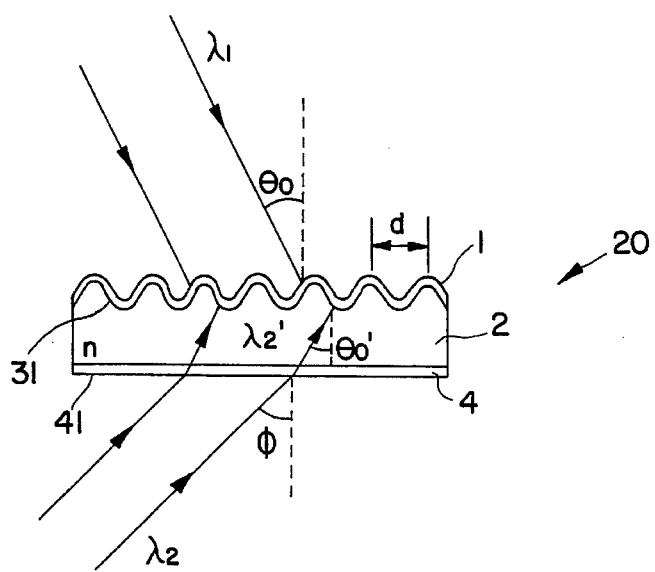
FIG. 2 shows a configuration for a diffraction element according to a second example of the present invention.

FIG. 2 shows a diffraction element 20 according to a second example of the present invention. The diffraction element 20 is essentially identical with the diffraction element 30 of the first example of the present invention except that a reflection preventing film 4 is provided on a back face 41 of a transparent substrate 2, as is shown in FIG. 1A.

As is seen from Equation (3), in general, an angle $\phi$ at which light of the wavelength $\lambda_2$ is incident on the back face 32 of the transparent substrate 2 (shown in FIG. 1A) is larger than the angle $\theta_O'$ at which the same light is incident on the reflective film 1 through the transparent substrate 2. Hence, the light of the wavelength $\lambda_2$ is likely to be reflected at the back face 32. In the second example of the present invention, therefore, a reflection preventing film 4 is provided on the back side of the transparent substrate 2, defining the back face 41, so as to enhance the transmission of the light incident on the transparent substrate 2.

Assuming that light of the wavelength $\lambda_2$ is incident on the reflective film 1 at an incident angle $\theta_O$ and is diffracted at a diffraction angle $\alpha'$, the following Equation (5) holds, which is similar to Equation (1):

$$\sin\theta_O + \sin\alpha' = \lambda_2/d \qquad \text{Eq. (5)}$$

If the light of the wavelength $\lambda_2$ is totally reflected by the reflective film 1 instead of being diffracted thereby, the diffraction angle $\alpha'$ satisfies Inequality (6) shown below. It is assumed that the relationship $\lambda_2 > \lambda_1$ holds.

$$\sin \alpha' > 1 \qquad \text{Ineq. (6)}$$

Thus no value of $\alpha'$ satisfies inequality (6)

When the incident angle $\theta_O$ is the Littrow angle $\theta_L$, Equation (2) is satisfied. Substituting Equations (5) and (2) into Inequality (6) gives the following Inequality (7):

$$\lambda_{2-\lambda_1}/2 > d \qquad \text{Ineq. (7)}$$

Therefore, assuming that Inequality (7) is satisfied, it is presumed that, when multiplexed light of the wavelengths $\lambda_1$ and $\lambda_2$ is incident on the diffraction element 20 (30), only the light of the wavelength $\lambda_1$ is diffracted, while the light of the wavelength $\lambda_2$ is totally reflected.

When the refractive index n of the transparent substrate 2 satisfies Equation (8) shown below, on the other hand, the light of the wavelength $\lambda_2$ in the transparent substrate 2 is diffracted by the reflective film 1 instead of being reflected thereby:

$$n = \lambda_2/\lambda_1 \qquad \text{Eq. (8)}$$

The reason is that the light of the wavelength $\lambda_2$ has an equivalent wavelength of $\lambda_1$ within the transparent substrate 2, when Equation (8) is met.

EXAMPLE 3

Figure 3:
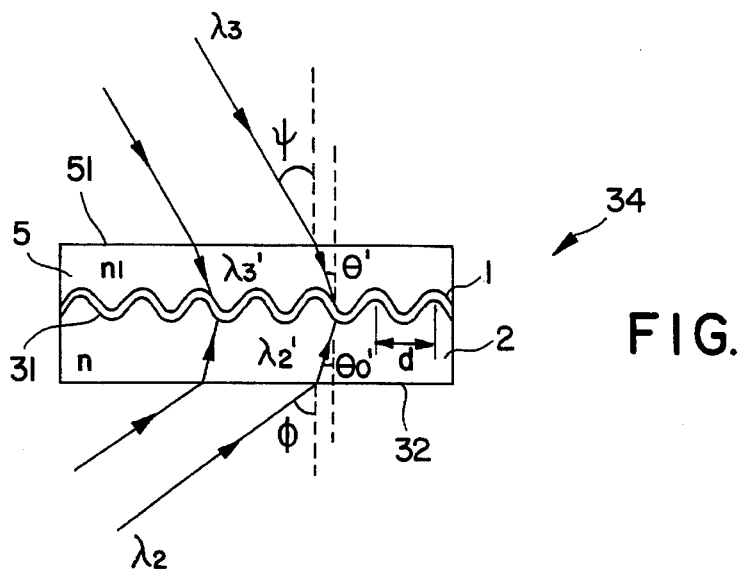
FIG. 3 shows a configuration for a diffraction element according to a third example of the present invention.

FIG. 3 shows a diffraction element 34 according to a third example of the present invention. The diffraction element 34 is essentially identical with the diffraction element 30 of the first example of the present invention except that a transparent protection film 5 is provided on the upper face of a reflective film 1.

Light of the wavelength $\lambda_3$ is incident on an upper face 51 of the transparent protection film 5 at an incident angle $\phi$, and is transmitted through the transparent protection film 5 so as to be incident on the reflective film 1 at an angle $\theta'$. Assuming that the refractive index is $n_1$, the incident angles $\phi$ and $\theta'$ satisfy the following Equation (9):

$$n_1 \times \sin \theta' = \sin \phi \qquad \text{Eq. (9)}$$

The equivalent wavelength $\lambda_3'$ of the light transmitted through the transparent protection film 5 satisfies the following Equation (10):

$$\lambda_3' = \lambda_3/n_1 \qquad \text{Eq. (10)}$$

Thus, by ensuring that the refractive index $n_1$ of the transparent protection film 5 satisfies the relationship $n_1 = \lambda_1/\lambda_3$, and by so adjusting the incident angle $\phi$ that the relationship $\theta' = \theta_O = \theta_L$ substantially holds, it becomes possible to achieve substantially the same diffraction efficiency and spectroscopic characteristics for the light of the wavelength $\lambda_3$ incident on the diffraction element 34 as that for the light of the wavelength $\lambda_1$ incident on the diffraction element 30 in the first example of the present invention.

The behavior of the incident light within the transparent substrate 2 can be expressed by Equations (3) and (4), as in the case of the first example of the invention.

In cases where light of the wavelength $\lambda_2$ is incident on the upper face 51 of the diffraction element 34 at an angle $\phi$, and is transmitted through the transparent protection film 5 so as to be incident on the reflective film 1, the light would be totally reflected by the reflective film 1, instead of being diffracted thereby, under the condition expressed by Inequality (11) and Equation (12) shown below, since $\lambda_2'(=\lambda_2/n_1)$ and $\lambda_3'(=\lambda_3/n_1=\lambda_1)$ satisfy Equation (7).

$$\lambda_2 - \lambda_3/2 > n_{1\times}d \qquad \text{Ineq. (11)}$$

$$n = n_{1\times\lambda_2/\lambda_3} \qquad \text{Eq. (12)}$$

According to the present example, the transparent protection film 5 provided on the reflective film 1 effectively prevents the grating surface from contacting the atmosphere, whereby the incidence of erosion decreases so that the diffraction element 34 will last for a long period of time.

EXAMPLE 4

Figure 4:
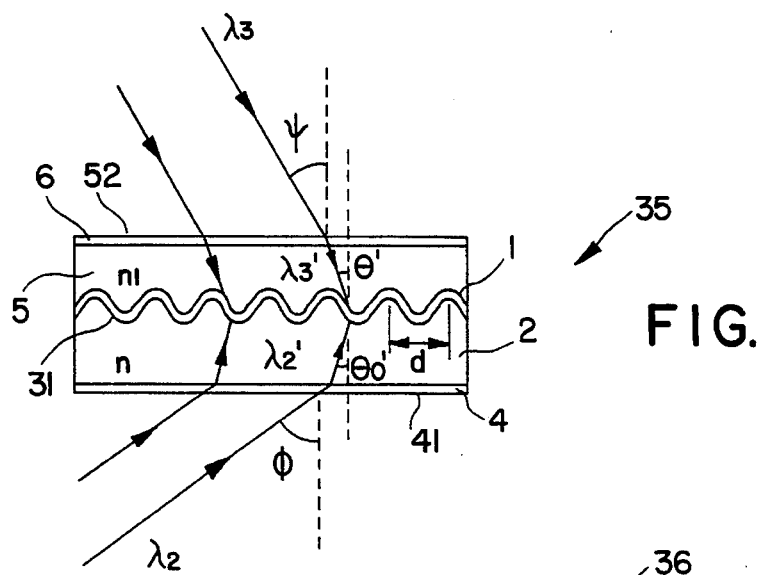
FIG. 4 shows a configuration for a diffraction element according to a fourth example of the present invention.

FIG. 4 shows a diffraction element 35 according to a fourth example of the present invention. The diffraction element 35 is essentially identical with the diffraction element 34 of the third example of the present invention except that a reflection preventing film 4 is provided on the back face 32 of a transparent substrate 2 and that a reflection preventing film 6 is provided on the surface 51 of a transparent protection film 5.

According to the above configuration, reflection of light incident on an upper face 52 and a lower face (back face) 41 of the diffraction element 35 is restrained, so that the incident light is efficiently transmitted into the transparent protection film 5 and the transparent substrate 2.

EXAMPLE 5

Figure 5A:
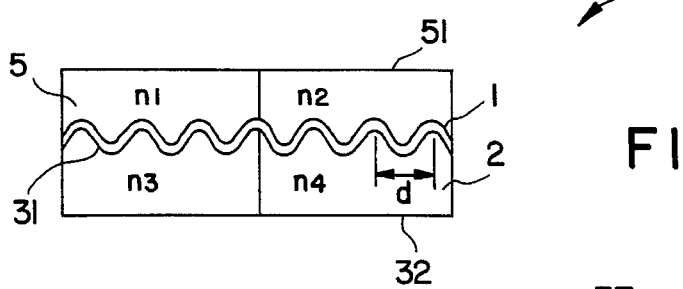
FIG. 5A shows a configuration for a diffraction element according to a fifth example of the present invention.
Figure 5B:
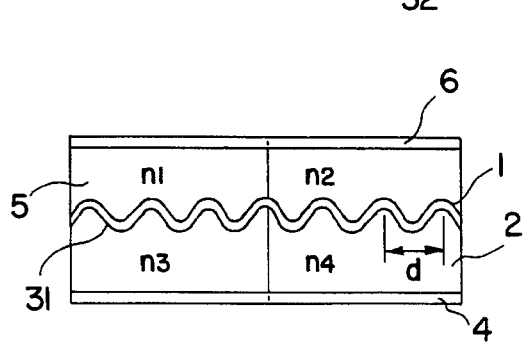
FIG. 5B shows another configuration for a diffraction element according to a fifth example of the present invention.

FIGS. 5A and 5B show, respectively, diffraction elements 36 and 37 according to a fifth example of the present invention. The diffraction element 36 includes a transparent substrate 2 and a transparent protection film 5, each of which is composed of a plurality of sections having different refractive indices. As is shown in FIG. 5A, the transparent substrate 2 may be composed of two sections, namely, a section having a refractive index of $n_3$ and a section having a refractive index of $n_4$. Since light of a wavelength $\lambda$, incident on a section with a refractive index of $n_k$, is diffracted at an equivalent wavelength $\lambda'$ of $\lambda' = \lambda/n_k$ (wherein k=3 or 4), the diffraction element 36 is capable of diffracting light beams of different wavelengths of $\lambda = n_k\lambda_1$ (wherein k=3 or 4). Similarly, the transparent protection film 5 may be composed of two sections having respective refractive indices of $n_1$ and $n_2$, in which case the diffraction element 36 is capable of diffracting light beams of two wavelengths of $\lambda = _k\lambda_1$ (wherein k=1 or 2). It is applicable to provide more than two sections having different refractive indices. It is also applicable to provide two such sections having different refractive indices for either the transparent substrate 2 and the transparent protection film 5.

As is shown in FIG. 5B, the diffraction element 37 is identical with the diffraction element 36 except that the diffraction element 37 further includes a reflection preventing film 4 provided on a lower face (back face) 32 of a transparent substrate 2 and a reflection preventing film 6 provided on the surface 51 of a transparent protection film 5. According to this configuration, reflection of light incident on an upper face 52 and the lower face 41 of the diffraction element 37 is restrained, so that the incident light is efficiently transmitted through the transparent protection film 5 and the transparent substrate 2. The reflection preventing film 4 may be provided on either the upper face 51 or the lower face 32. The structure of the reflection preventing film may change according to the refractive index of the material in the respective section therebelow.

EXAMPLE 6

Figure 6:
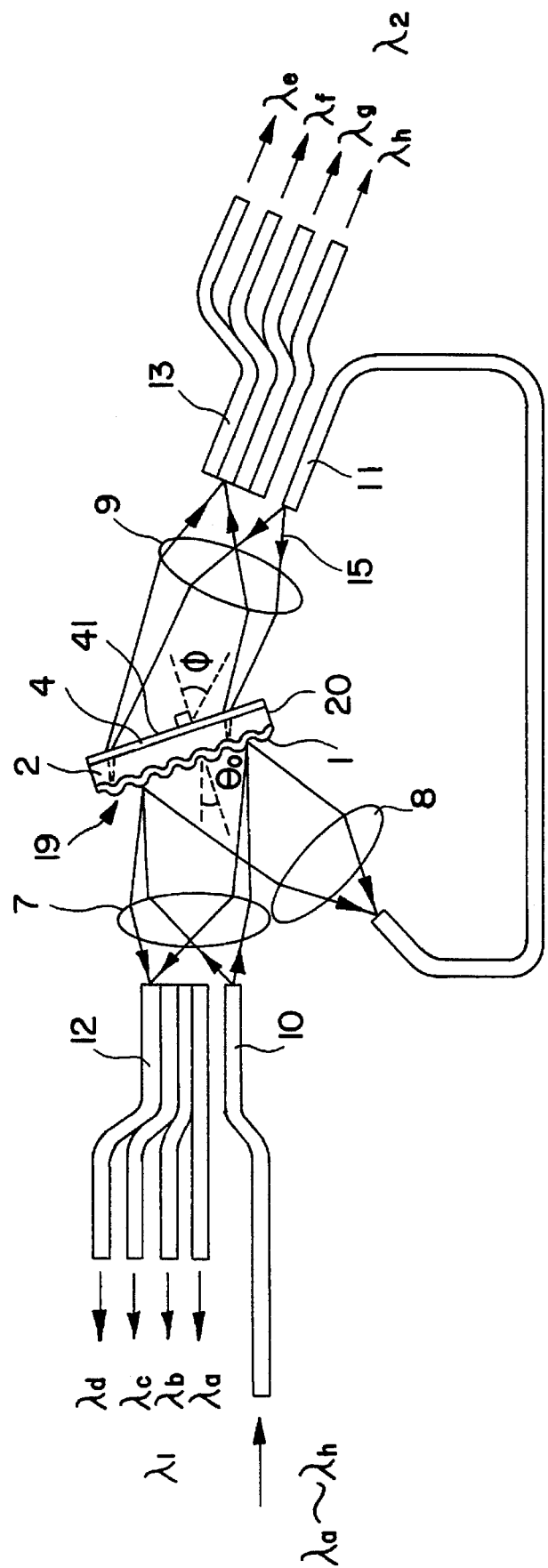
FIG. 6 shows a configuration for an optical multiplexing/demultiplexing device according to the present invention.

An optical multiplexing/demultiplexing device incorporating a diffraction element according to the present invention will be described with reference to FIG. 6. FIG. 6 shows a configuration for the optical multiplexing/demultiplexing device incorporating the diffraction element 20 of the second example of the invention. However, it is also applicable to use, instead of the diffraction element 20, any of the other diffraction elements 30 and 33 to 37 shown in the previous examples of the invention. The diffraction element 20, a lens 7, a first input fiber 10, and a first light-receiving fiber array 12 are Littrow-mounted. The diffraction element 20, a lens 9, a second input fiber 11, and a second light-receiving fiber array 13 are also Littrow-mounted. A lens 8 serves to direct light totally reflected by a reflective film 1 of the diffraction element 20 to the second input fiber 11.

Figure 7:
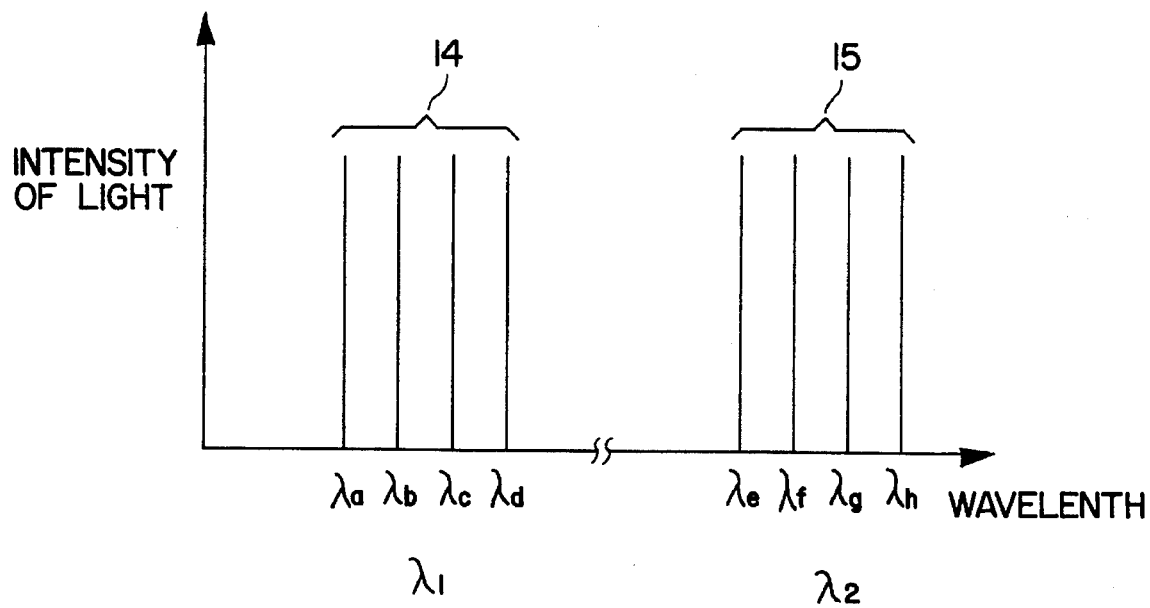
FIG. 7 is a conceptual diagram showing a spectral distribution of multiplexed light of wavelengths $\lambda_a$ to $\lambda_h$.

Light which comes out from the first input fiber 10 is multiplexed light, i.e. light in which optical wavelength divisions are multiplexed, and has a spectral distribution shown in FIG. 7. Shorter wavelength multiplexed light 14 is of a wavelength band (hereinafter referred to as a 'wavelength band $\lambda_1$') that includes respective spectra components of wavelengths $\lambda_a$, $\lambda_b$, $\lambda_c$, and $\lambda_d$. Longer wavelength multiplexed light 15 is of a wavelength band (hereinafter referred to as a ' wavelength band $\lambda_2$') that includes respective spectra components of wavelengths $\lambda_e$, $\lambda_f$, $\lambda_g$, and $\lambda_h$.

Hereinafter, an operation of the optical multiplexing/demultiplexing device of the present example will be described. Although the descriptions will be focused on the operation as a optical demultiplexing device, the device can also serve as an optical multiplexing device by reversing the optical inputs and outputs.

Multiplexed light of wavelengths $\lambda_a$ to $\lambda_h$ comes out from the first input fiber 10 and is collimated by the lens 7 so as to be incident on a grating surface 19 of the diffraction element 20, on which surface 19 the reflective film 1 is provided, at an incident angle $\theta_O$. The grating surface 19 has high optical dispersion properties with high diffraction efficiency for the multiplexed light 14 of the shorter wavelength band $\lambda_1$. Light of the wavelengths $\lambda_a$ to $\lambda_d$ is optically dispersed according to Equation (1), and is led through the lens 7 so as to be focused (converged) on each optical fiber of the first light-receiving fiber array 12. FIG. 6 schematically shows the light of the wavelength $\lambda_d$. Thus, the light of the wavelengths $\lambda_a$ to $\lambda_d$ is optically dispersed so as to be output from each optical fiber of the lightreceiving fiber array 12.

On the other hand, the multiplexed light 15 of the longer wavelength band $\lambda_2$ satisfies Inequality (7), so that it is totally reflected, instead of being diffracted or optically dispersed, by the grating surface 19 provided with the reflective film 1. The light of the wavelength $\lambda_e$ to $\lambda_h$ is transmitted to the second input fiber 11 through the lens 8.

The multiplexed light 15, coming out from the second input fiber 11, is collimated by the lens 9 so as to be incident on the back face 41 of the diffraction element 20, on which face 41 a reflection preventing film 4 is provided, at an incident angle $\phi$. Since the refractive index n satisfies Equation (6), the multiplexed light 15 of the wavelength band $\lambda_2$ is, by way of the transparent substrate 2, optically dispersed by the reflective film 1 at a similarly high diffraction efficiency. The light of the wavelengths $\lambda_e$ to $\lambda_h$ is led through the lens 9 so as to be focused on each optical fiber of the second light-receiving fiber array 13.

With respect to the lattice pitch d, using a blazed diffraction grating having, for example, 1200 lattice grooves (/mm) for the diffraction element 20 would increase the diffraction efficiency of the optical multiplexing/demultiplexing device. For example, the refractive index n of the transparent substrate 2 may be prescribed to be 1.5 to 1.6 in cases where optical dispersion is to be conducted for multiplexed light with a short wavelength band $\lambda_1$ of 0.8 µm and a long wavelength band $\lambda_2$ of 1.3 µm. In this case, the light from the first input fiber 10 is incident on the diffraction element 20 at an incident angle $\theta_0$ of about 30°, whereas the light from the second input fiber 11 is incident on the diffraction element 20 at an incident angle of about 54°. As for the transparent substrate 2, it may be formed of a dielectric material such as glass and transparent resin.

As has been described, according to the present example, it is possible to realize an optical multiplexing/demultiplexing device having an equally high diffraction efficiency for light beams of different wavelengths. In other words, an optical multiplexing/demultiplexing device is provided which has only a small insertion loss of incident light and is capable of optical dispersion in a broad wavelength range.

EXAMPLE 7

Next, an optical multiplexing/demultiplexing device according to another example of the present invention will be described with reference to FIGS. 8A and 8B.

Figure 8A:
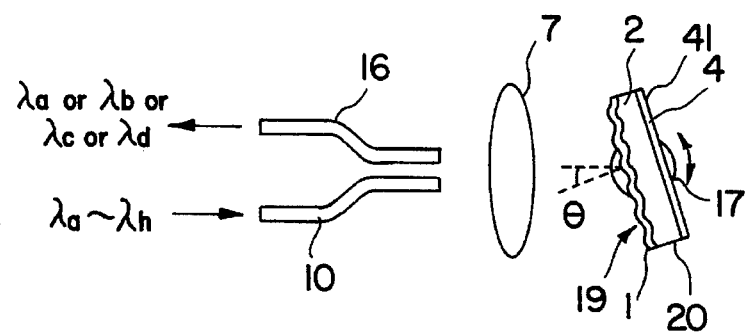
FIG. 8A shows a configuration for an optical multiplexing/demultiplexing device according to the present invention.
Figure 8B:
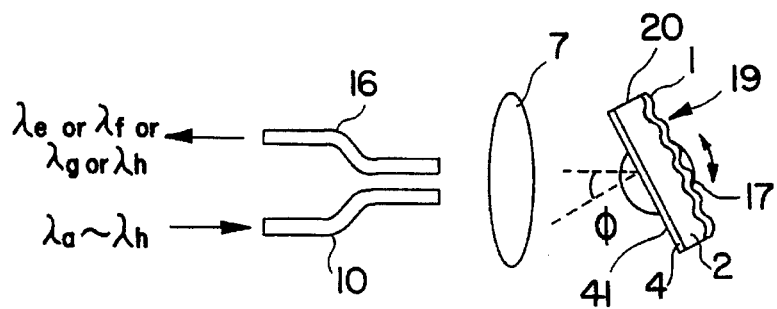
FIG. 8B shows a configuration for an optical multiplexing/demultiplexing device according to the present invention.
Figure 9:
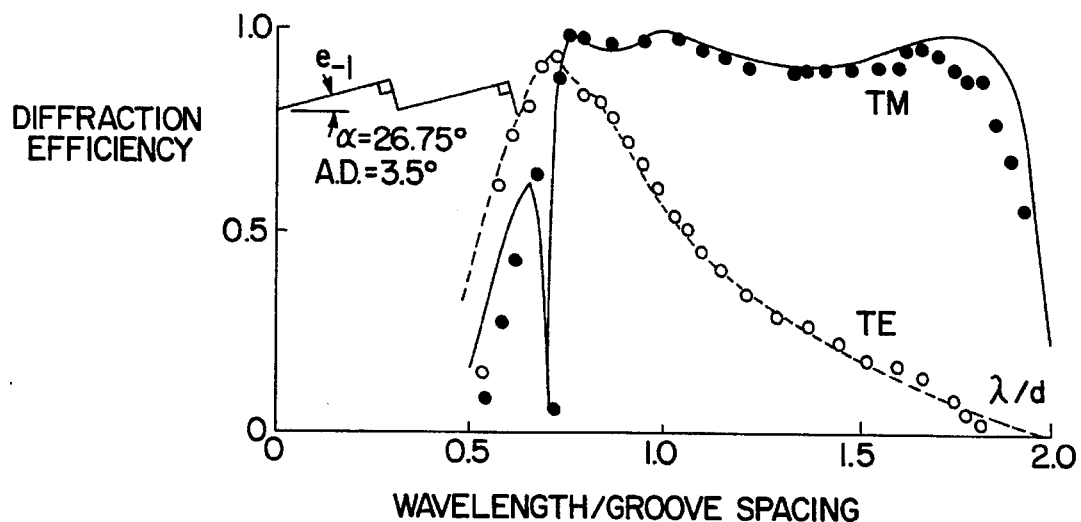
FIG. 9 shows the wavelength dependence of diffraction efficiency.
Figure 10:
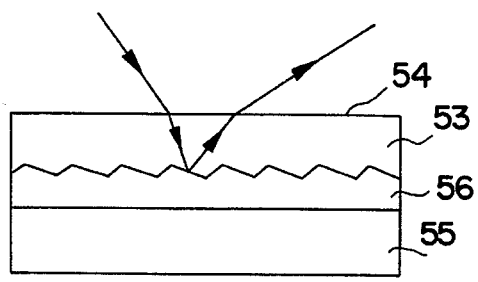
FIG. 10 shows a configuration for a conventional diffraction element.
Figure 11:
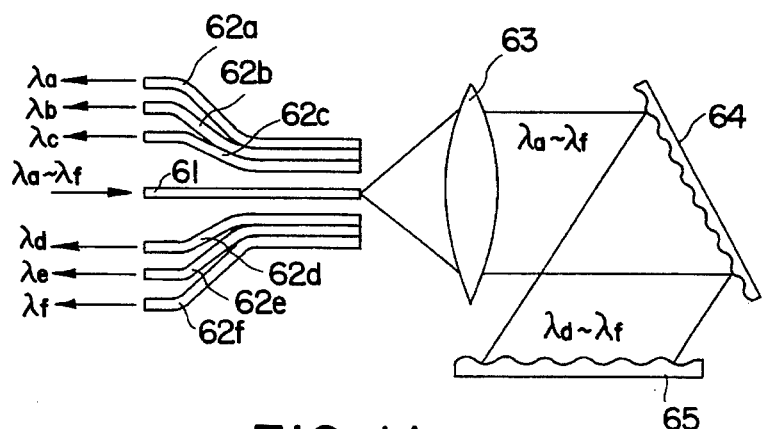
FIG. 11 shows a configuration for a conventional optical multiplexing/demultiplexing device.

AS is shown in FIGS. 8A and 8B, diffraction element 20, a lens 7, an input fiber 10, and a lightreceiving fiber 16 are Littrow-mounted. The diffraction element 20 can rotate around a rotation axis parallel to a direction in which the lattice grooves extend, by means of a rotary mechanism 17. This makes available both a front face 19 and a back face 41 for light that enters through the lens 7, and allows the angle at which the light is incident on either of the faces 19 and 41 to be adjusted. FIG. 8A shows a configuration in the case where multiplexed light 14 of the short wavelength band $\lambda_1$ is selectively optically dispersed. FIG. 8B shows a configuration in the case where multiplexed light 15 of the long wavelength band $\lambda_2$ is selectively optically dispersed. The diffraction element 20 may be replaced by any of the other diffraction elements 30 and 33 to 37 shown in the above-described examples of the invention.

An operation of the optical multiplexing/demultiplexing device with the abovementioned structure will be described below, with reference to FIGS. 7, 8A, and 8B. As is shown in FIGS. 8A and 8B, multiplexed light of wavelengths $\lambda_a$ to $\lambda_h$ goes out from the input fiber 10 and is collimated by the lens 7 so as to be incident on the diffraction element 20. In FIG. 8A, the optical multiplexing/demultiplexing device is so adjusted that the multiplexed light is incident on a grating surface 19 of the diffraction element 20, on which surface 19 a reflective film 1 is provided, at an incident angle $\theta$. When the incident angle $\theta$ is substantially equal to $\theta_O$, the multiplexed light 14 of the wavelength band $\lambda_1$ is optically dispersed by the diffraction element 20 at a high diffraction efficiency. Since the input fiber 10 and the light-receiving fiber 16 are juxtaposed, only the diffracted light of the wavelength diffractable at the incident angle expressed by Equation (2), i.e. the Littrow angle, is focused onto the light-receiving fiber 16. Since the light of the wavelength band $\lambda_2$ is not diffracted by the diffraction element 20, only the light of the wavelength band $\lambda_1$ is selectively optically dispersed, as is described below:

It is assumed that the light of the wavelength $\lambda_a$ is focused onto the light-receiving fiber 16 under the condition that the incident angle $\theta$ equals $\theta_a$. By slightly rotating the diffraction element 20 anticlockwise by means of the rotary mechanism 17 so that the incident angle varies from $\theta_b$ to $\theta_c$ and $\theta_d$, respectively, the light of the respective wavelengths $\lambda_b$, $\lambda_c$, and $\lambda_d$ can be focused onto the light-receiving fiber 16.

When the multiplexed light 15 of the long wavelength band $\lambda_2$ is to be selectively optically dispersed, the diffraction element 20 is reversed (so that the back face 41 comes in front) by means of the rotary mechanism 17, as is shown in FIG. 8B. Thus, the multiplexed light 15, going out from the input fiber 10, is incident on the back face 41 of the diffraction element 20 at an incident angle $\phi$, transmitted through a reflection preventing film 4 and a transparent substrate 2, and is incident on the grating surface (or the reflective film 1). Thus, the multiplexed light 15 is optically dispersed with a high diffraction efficiency by the diffraction element 20, as in the case of the multiplexed light 14. By adjustment of the incident angle with the rotary mechanism 17, as is described above, light of any of the desired wavelength $\lambda_e$ to $\lambda_h$ can be focused onto the light-receiving fiber 16 so as to be selectively output.

As has been described, according to the present example, optical dispersion in two wavelength bands can be selectively conducted at a high diffraction efficiency by rotating a single diffraction element, the resultant light being output from a single light-receiving fiber. In other words, optical dispersion is achieved with only a small insertion loss of incident light and in a broad wavelength range. Furthermore, in contrast to the sixth example of the invention, there is no need for incorporating a second input fiber or a second light-receiving fiber array. The rotary mechanism 17 can be implemented by a stepping motor capable of accurate positioning or by various other driving systems for controlling any rotary mechanism.

Although the diffraction element 20 is rotated in the present example, the same effect can be attained by moving the input fiber 10 and/or the light-receiving fiber 16 instead of rotating the diffraction element 20. This can be implemented by a high-accuracy moving mechanism, such as a multi-layer-type piezoelectric element and a linear actuator applicable to an optical pickup.

As will be appreciated, use of the diffraction element 34 or 35, instead of the diffraction element 20, would make it possible to conduct optical dispersion with a high diffraction efficiency in more than two wavelength bands.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A diffraction element comprising:

a transparent substrate having a first face and a second face;

periodic grooves engraved on the first face;

a reflective film provided on the first face having the periodic grooves; and a antireflection film provided on the second face, for preventing incident light in air from being reflected by said second face, wherein the periodic grooves and the reflective film constitute a diffraction grating.

2. A diffraction element according to claim 1, wherein the reflective film is formed substantially symmetrical with respect to a rotation of 180° around an axis parallel to the grooves.

3. A diffraction element according to claim 1, wherein the first face and the second face of the transparent substrate are substantially parallel.

4. A diffraction element according to claim 1, wherein the first face and the second face of the transparent substrate make a certain angle.

5. A diffraction element according to claim 1 further comprising a transparent protection layer provided on the reflective film.

6. A diffraction element according to claim 5 further comprising another antireflection film provided on the transparent protection layer.

7. A diffraction element comprising:

a transparent substrate having a first face and a second face, wherein the transparent substrate is composed of a plurality of sections each having a different refractive index from one another;

periodic grooves engraved on the first face;

a reflective film provided on the first face having the periodic grooves; and an antireflection film provided on the second face, wherein the periodic grooves and the reflective film constitute a diffraction grating.

8. A diffraction element according to claim 7 further comprising a transparent protection layer provided on said reflective film.

9. A diffraction element according to claim 8, wherein the transparent protection layer includes a plurality of sections each having different refractive index from one another.

10. A diffraction element according to claim 8 further comprising another antireflection film provided on the transparent protection layer.

11. A diffraction element according to claim 9 further comprising another antireflection film provided on the transparent protection layer.

12. A diffraction element according to claim 7, wherein the transparent protection layer includes a plurality of sections each having different refractive index from one another.

13. A diffraction element according to claim 12 further comprising another antireflection film provided on the transparent protection layer.

14. An optical multiplexing/demultiplexing device including a diffraction element having a first incident face and a second incident face, wherein the optical multiplexing/demultiplexing device comprises:

first optical input means for letting light be incident on the first incident face of the diffraction element at a first incident angle;

first light-receiving means for receiving first diffracted light from the diffraction element, the first diffracted light having been incident on the first incident face of the diffraction element;

second optical input means for receiving light reflected by the reflective film of the diffraction element, guiding the reflected light, and letting the reflected light be incident on the second incident face of the diffraction element at a second angle; and second light-receiving means for receiving second diffracted light from the diffraction element, the second diffracted light having been incident on the second incident face of the diffraction element.

15. An optical multiplexing/demultiplexing device according to claim 14, wherein the diffraction element includes:

a transparent substrate having a first face and a second face;

periodic grooves engraved on the first face;

a reflective film provided on the first face having the periodic grooves; and a antireflection film provided on the second face, the first incident face corresponding to the first face provided with the reflective film, and the second incident face corresponding to the second face provided with the antireflection film.

16. An optical multiplexing/demultiplexing device according to claim 15, wherein the reflective film is formed substantially symmetrical with respect to a rotation of 180° around an axis parallel to the grooves.

17. A An optical multiplexing/demultiplexing device according to claim 15 further comprising a transparent protection layer provided on the reflective film.

18. An optical multiplexing/demultiplexing device according to claim 17 further comprising a first lens that is arranged in Littrow-mounting with respect to the first incident face of the diffraction element and a second lens that is arranged in Littrow-mounting with respect to the second incident face of the diffraction element.

19. An optical multiplexing/demultiplexing device according to claim 17, wherein each of the first and the second incident angles is an incident angle $\bar{O}$ in a range satisfying the following relationship:

$$\theta_L - 5° \leq \theta \leq \theta_L + 5°$$

where $\theta_L$ is the Littrow angle, and wherein a wavelength $\lambda_1$ of the light incident on the first incident face and diffracted by the diffraction element, and a wavelength $\lambda_2$ of the light incident on the second incident face and reflected by the diffraction element (where $\lambda_2 > \lambda_1$) satisfies the relationships:

$$\lambda_2 - \lambda_1/2 > n_{1 \times d}$$

$$n = n_1 \times \lambda_2 / \lambda_1$$

where n is a refractive index of the transparent substrate, $n_1$ is a refractive index of the transparent protection layer, and d is a pitch of the grooves.

20. An optical multiplexing/demultiplexing device according to claim 15 further comprising a first lens that is arranged in Littrow-mounting with respect to the first incident face of the diffraction element and a second lens that is arranged in Littrow-mounting with respect to the second incident face of the diffraction element.

21. An optical multiplexing/demultiplexing device according to claim 15, wherein each of the first and the second incident angles is an incident angle $\theta$ in a range satisfying the following relationship:

$$\theta_L - 5° \leq \theta \leq \theta_L + 5°$$

where $\theta$ is the Littrow angle, and wherein a wavelength $\lambda_1$ of the light incident on the first incident face and diffracted by the diffraction element, and a wavelength $\lambda_2$ of the light incident on the second incident face and reflected by the diffraction element (where $\lambda_2 > \lambda_1$) satisfies the following relationships:

$$\lambda_2 - \lambda_1/2 > d$$

$$n = \lambda_2 / \lambda_1$$

where n is a refractive index of the transparent substrate and d is a pitch of the grooves.

22. An optical multiplexing/demultiplexing device including a diffraction element having a first incident face and a second incident face, the diffraction element comprising a transparent substrate having a first face and a second face which correspond to the first incident face and the second incident face, respectively; periodic grooves engraved on the first face; a reflective film provided on the first face having the periodic grooves; and an antireflection film provided on the second face, wherein the periodic grooves and the reflective film constitute a diffraction grating; wherein the optical multiplexing/demultiplexing device comprises:

optical input means for letting light be incident on the diffraction element at an incident angle;

light-receiving means for receiving light diffracted by the diffraction element; and positioning means for altering positions and/or directions of at least one of the diffraction element, the optical input means, and the light-receiving means.

23. An optical multiplexing/demultiplexing device according to claim 22, wherein the positioning means allows a first arrangement for letting the light from the optical input means be incident on the first incident face of the diffraction element and a second arrangement for letting the light from the optical input means be incident on the second incident face of the diffraction element.

24. An optical multiplexing/demultiplexing device according to claim 23 further comprising a lens for collimating light from the optical input means and for converging light diffracted by the diffraction element onto the light-receiving means, wherein the first arrangement is a Littrow mounting arrangement with respect tot he first incident face of the diffraction element, and the second arrangement is a Littrow mounting arrangement with respect to the second incident face of the diffraction element.

25. An optical multiplexing/demultiplexing device according to claim 23, wherein the positioning means includes a mechanism for rotating the diffraction element and for thus allowing the optical multiplexing/demultiplexing device to shift from either one of the first and second arrangements to the other.

26. An optical multiplexing/demultiplexing device according to claim 22, wherein the reflective film is formed substantially symmetrical with respect to a rotation of 180° around an axis parallel to the grooves.

27. An optical multiplexing/demultiplexing device according to claim 22 further comprising a transparent protection layer provided on the reflective film.

28. An optical multiplexing/demultiplexing device according to claim 27, wherein each incident angle at which the light is incident on the first and second incident faces is an incident angle $\theta$ in a range satisfying the following relationship:

$$\lambda_L - 5° \leq \theta \leq \theta_L 5°$$

where $\theta_L$ is the Littrow angle, and wherein a wavelength $\lambda_1$ of the light incident on the first incident face and diffracted by the diffraction element, and a wavelength $\lambda_2$ of the light incident on the second incident face and reflected by the diffraction element (where $\lambda_2 > \lambda_1$) satisfies the following relationships:

$$\lambda_2 - \lambda_1 / 2 > n_1 d$$

$$n = n_1 \times \lambda_2 / \lambda_1$$

where n is a refractive index of the transparent substrate, $n_1$ is a refractive index of the transparent protection layer, and d is a pitch of the grooves.

29. An optical multiplexing/demultiplexing device according to claim 22, wherein each incident angle at which the light is incident on the first and second incident faces is an incident angle— in a range satisfying the following relationship:

$$\theta_L - 5° \leq \theta \leq \theta_L + 5°$$

where $\theta_L$ is the Littrow angle, and wherein a wavelength $\lambda_1$ of the light incident on the first incident face and diffracted by the diffraction element, and a wavelength $\lambda_2$ of the light incident on the second incident face and reflected by the diffraction element (where $\lambda_2 > \lambda_1$) satisfies the following relationships:

$$\lambda_2 - \lambda_1/2 > d$$

$$n = \lambda_2/\lambda_1$$

where n is a refractive index of the transparent substrate and d is a pitch of the grooves.

30. An optical multiplexing/demultiplexing device including a diffraction element comprising a transparent substrate having a first face and a second face, wherein the transparent substrate is composed of a plurality of sections each having a different refractive index from one another; periodic grooves engraved on the first face; a reflective film provided on the first face having the periodic grooves; and an antireflection film provided on the second face, wherein the periodic grooves and the reflective film constitute a diffraction grating; wherein the optical multiplexing/demultiplexing device comprises:

optical input means for letting light be incident on the diffraction element at an incident angle;

light-receiving means for receiving light diffracted by the diffraction element; and positioning means for altering positions and/or directions of at least one of the diffraction element, the optical input means, and the light-receiving means.

31. An optical multiplexing/demultiplexing device according to claim 30, wherein the optical input means and the light-receiving means are arranged at a same side of the lens.

32. An optical multiplexing/demultiplexing device comprising:

a diffraction element having a first incident face and a second incident face, optical input means for letting light be incident on the diffraction element at an incident angle;

light-receiving means for receiving light diffracted by the diffraction element; and positioning means for altering positions and/or of at least one of the diffraction element, the optical input means, and the light-receiving means, and a lens for collimating light from the optical input means onto the diffraction element and for converging light diffracted by the diffraction element onto the light-receiving means, a position of the lens being between the optical input means and the diffraction element and being between the light-receiving means and the diffraction element, wherein the positioning means allows a first Littrow mounting with respect to the first incident face of the diffraction element and a second Littrow mounting with respect to the second incident face of the diffraction element.

* * * * *

UNITED STATES PATENT AND TRADEMARK OFFICE
CERTIFICATE OF CORRECTION

PATENT NO.   : 5,457,573
DATED        : October 10, 1995
INVENTOR(S)  : Iida et al.

It is certified that error appears in the above-identified patent and that said Letters Patent is hereby corrected as shown below:

Column 13, line 55, "a" should be --an--.

Column 15, line 30, claim 19, delete "$\lambda_2 > \lambda_1$" and insert --$\lambda_2 > \lambda_1$--.

Column 16, line 53, delete "$\lambda_L - 5° \leq \theta \leq \theta_L 5°$" and insert --$\theta_L - 5° \leq \theta \leq \theta_L + 5°$--.

Column 16, line 61, delete "$\lambda_2 - \lambda_1/2 > n_1 d$" and insert --$\lambda_2 - \lambda_1/2 > n_1 \times d$--.

Signed and Sealed this

Fourth Day of June, 1996

Attest:

BRUCE LEHMAN

Attesting Officer

Commissioner of Patents and Trademarks